(12) United States Patent
Komori

(10) Patent No.: US 11,247,671 B2
(45) Date of Patent: Feb. 15, 2022

(54) OBJECT RECOGNITION DEVICE

(71) Applicant: Toyota Jidosha Kabushiki Kaisha, Toyota (JP)

(72) Inventor: Terumoto Komori, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 16/433,183

(22) Filed: Jun. 6, 2019

(65) Prior Publication Data

US 2020/0047748 A1 Feb. 13, 2020

(30) Foreign Application Priority Data

Aug. 10, 2018 (JP) .............................. JP2018-151605

(51) Int. Cl.
 *B60W 30/09* (2012.01)
 *G05D 1/02* (2020.01)
 *G01S 17/931* (2020.01)

(52) U.S. Cl.
 CPC ............ *B60W 30/09* (2013.01); *G05D 1/0214* (2013.01); *B60W 2554/801* (2020.02); *B60W 2554/804* (2020.02); *G01S 17/931* (2020.01)

(58) Field of Classification Search
 None
 See application file for complete search history.

(56) References Cited

U.S. PATENT DOCUMENTS

2018/0288320 A1* 10/2018 Melick .................... G01S 17/86
2019/0100140 A1    4/2019 Takaki
2019/0293758 A1*  9/2019 Masui .................... G01S 13/867

FOREIGN PATENT DOCUMENTS

| JP | 10-239436 A   | 9/1998 |
| JP | 2006-188129 A | 7/2006 |
| JP | 2009-186276 A | 8/2009 |
| JP | 2014-035669 A | 2/2014 |
| JP | 2018-097765 A | 6/2018 |
| WO | 2017/164017 A1 | 9/2017 |

* cited by examiner

*Primary Examiner* — Thomas G Black
*Assistant Examiner* — Ana D Thomas
(74) *Attorney, Agent, or Firm* — Dinsmore & Shohl LLP

(57) ABSTRACT

An object recognition device includes: a sensor; a storage device; and a processor configured to detect a first object and a second object around the vehicle, initially set, based on a detection position of the first object, an integration determination distance used to determine that the first object and the second object belong to the same object, estimate a traveling direction of the first object based on the sensor detection information, increase the integration determination distance along the traveling direction, after increasing the integration determination distance along the traveling direction, determine, based on the integration determination distance, whether the first object and the second object belong to the same object, and output the first object and the second object as the same object when it is determined that the first object and the second object belong to the same object.

9 Claims, 21 Drawing Sheets

FIG. 2
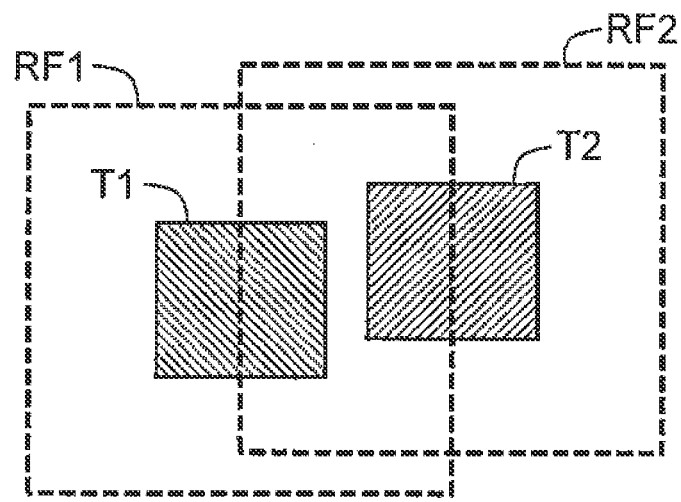
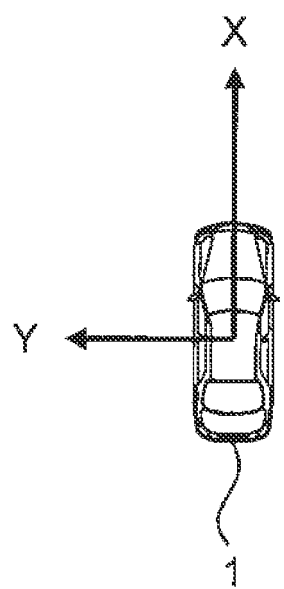

FIG. 4
RELATED ART
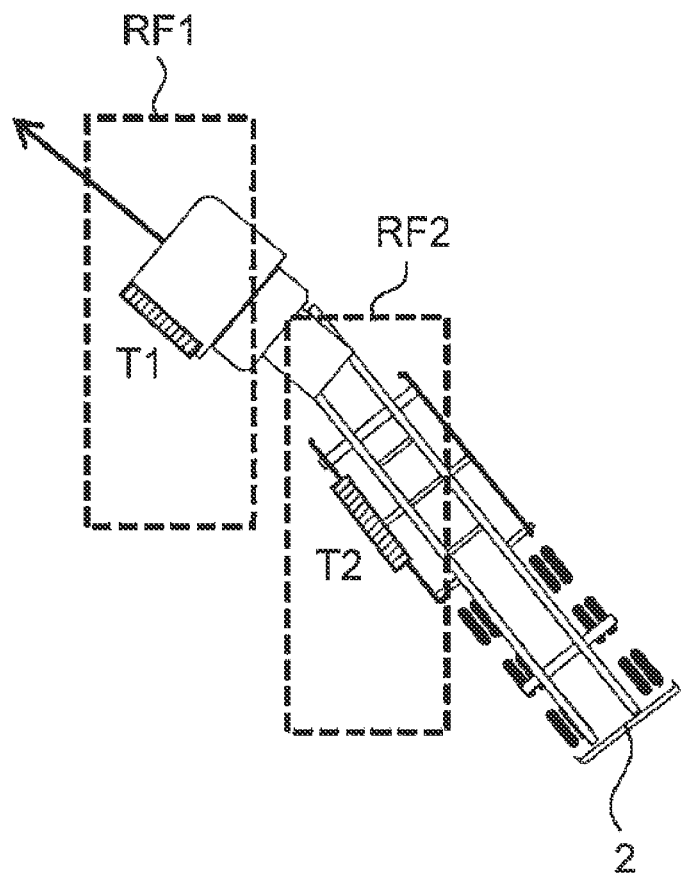
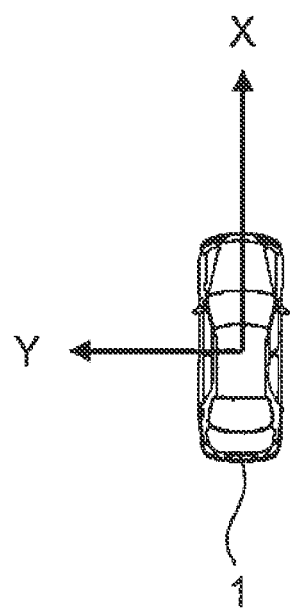

FIG. 7
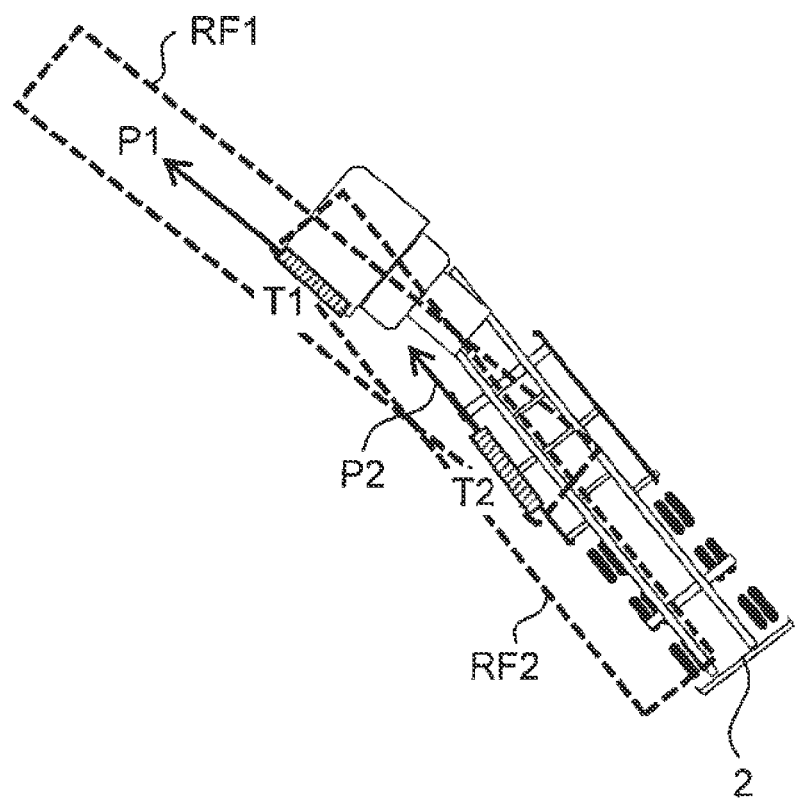
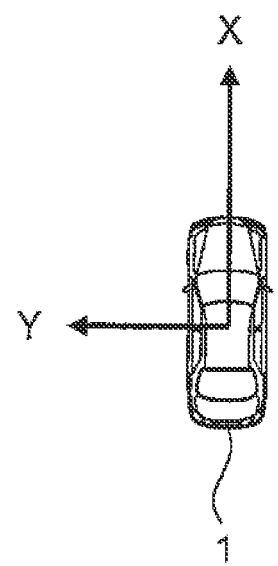

OBJECT RECOGNITION DEVICE

CROSS-REFERENCE TO RELATED APPLICATIONS

This application claims priority to Japanese Patent Application No. 2018-151605 filed on Aug. 10, 2018, which is incorporated herein by reference in its entirety including the specification, drawings and abstract.

BACKGROUND

1. Technical Field

The present disclosure relates to an object recognition device.

2. Description of Related Art

Japanese Patent Application Publication No. 2009-186276 (JP 2009-186276 A) discloses an object detection device mounted on a vehicle. The object detection device integrates a plurality of objects detected within a predetermined range and recognizes them as a single object. The predetermined range is a rectangular range with the front-rear width and the left-right width of the predetermined range variably set based on the absolute speed of the objects. In this case, the front-rear width of the predetermined range is increased along the traveling direction of the vehicle in which the object detection device is mounted. The left-right width of the predetermined range is increased along the left-right direction of the vehicle in which the object detection device is mounted.

SUMMARY

Consider a vehicle that detects surrounding objects using a sensor device. When it is determined that a plurality of detected objects belongs to the same object, the plurality of objects is integrated and recognized as the same object. To determine whether a plurality of detected objects belongs to the same object, an integration determination range (integration determination distance) based on the detection position of an object is used.

When the integration determination range (integration determination distance) is not appropriately set, a plurality of objects to be recognized as the same object may be erroneously recognized as separate objects. Conversely, a plurality of objects to be recognized as separate objects may be erroneously recognized as the same object. That is, in those cases, the object recognition accuracy is decreased.

According to the technique described in Japanese Patent Application Publication No. 2009-186276 (JP 2009-186276 A), the predetermined range used for integrating a plurality of objects is increased along the traveling direction of a vehicle in which the object detection device is mounted. However, the traveling direction of the vehicle is unrelated to the detected objects. The predetermined ranges increased along a direction unrelated to the objects are inappropriate for integrating the plurality of objects. Inappropriate range setting leads to a decrease in the object recognition accuracy.

The present disclosure provides a technique that can increase the object recognition accuracy of an object recognition device that recognizes objects around a vehicle.

An aspect of the disclosure provides an object recognition device mounted on a vehicle. The object recognition device includes: a sensor configured to detect a situation around the vehicle; a storage device in which sensor detection information is stored, the sensor detection information indicating a detection result detected by the sensor; and a processor configured to detect, based on the sensor detection information, a first object and a second object, the first object and the second object being present around the vehicle, initially set, based on a detection position of the first object, an integration determination distance, the integration determination distance being a distance used to determine that the first object and the second object belong to the same object, estimate a traveling direction of the first object based on the sensor detection information, increase the integration determination distance along the traveling direction, after increasing the integration determination distance along the traveling direction, determine, based on the integration determination distance, whether the first object and the second object belong to the same object, and output the first object and the second object as the same object when it is determined that the first object and the second object belong to the same object.

According to the aspect of the present disclosure, the accuracy of the integration determination processing based on the integration determination distance is increased and, as a result, the object recognition accuracy is increased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a conceptual diagram showing the integration determination processing according to the embodiment of the present disclosure;

FIG. 4 is a conceptual diagram showing a first comparative example;

FIG. 7 is a conceptual diagram showing an example of the integration determination processing according to the embodiment of the present disclosure;

DETAILED DESCRIPTION OF EMBODIMENTS

An embodiment of the present disclosure will be described below with reference to the attached drawings.

1. Overview

Figure 1:
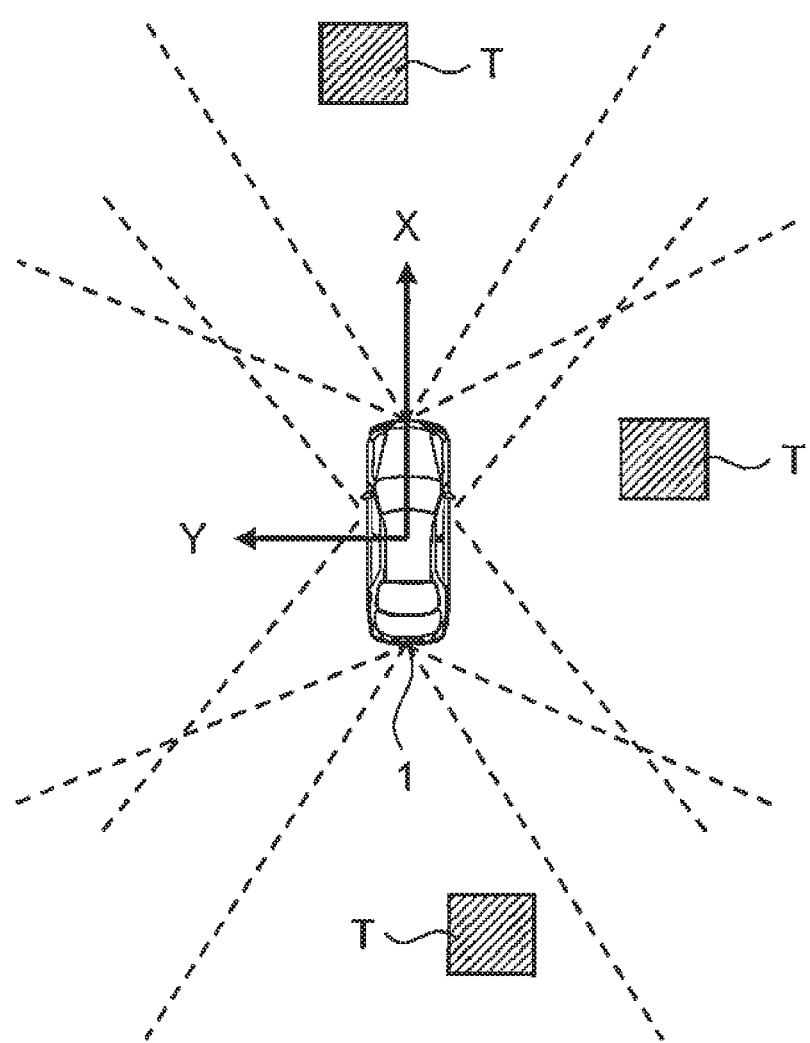
FIG. 1 is a conceptual diagram showing a vehicle according to an embodiment of the present disclosure.

FIG. 1 is a conceptual diagram showing a vehicle 1 according to the embodiment. The vehicle 1 includes a sensor device that detects the situation around the vehicle 1. Examples of the sensor device include a LIDAR (Laser Imaging Detection and Ranging), a radar, and a camera. The vehicle 1 uses the sensor device to detect an object T (target) around the vehicle 1.

FIG. 1 shows the detection positions of objects T in the X-Y coordinate system. The X-axis direction indicates the longitudinal direction of the vehicle 1, and the Y-axis direction indicates the lateral direction of the vehicle 1. The X-axis and Y-axis directions apply also to the following description.

When a plurality of detected objects T belongs to the same object, the plurality of detected objects T may be integrated (recognized) as the same object. For example, when different portions of the same object are detected as a plurality of objects T, the plurality of objects T may be integrated as the same object.

Note that the expression "a plurality of objects T belongs to the same object" includes a case where a plurality of objects T is identical. For example, assume that the same object is detected as two objects T, one by the LIDAR and the other by the camera, when their fields of view overlap. Due to a detection error, the detection positions of the two objects T do not necessarily match. Even in such a case, the two objects T may be integrated as the same object.

In the description below, the processing of integrating a plurality of detected objects T as the same object is referred to as the "object integration processing". The object integration processing may also be referred to as the "fusion processing" in some cases. To perform the object integration processing, it is first necessary to determine whether a plurality of detected objects T belongs to the same object. In the description below, this processing is referred to as the "integration determination processing".

FIG. 2 is a conceptual diagram showing the integration determination processing according to this embodiment. In the integration determination processing, it is determined whether a plurality of objects T should be integrated at least from the viewpoint of the detection position of each of the plurality of objects T. To make this determination, the "integration determination range RF" is used. The integration determination range RF is a range where an object can be determined (assumed) to be equivalent to (the same as) a detected object T. This integration determination range RF is set based on the detection position of an object T. For example, the integration determination range RF is a rectangular range including the detection range of the object T. However, it should be noted that the size and the shape of the integration determination range RF are not limited to the size and the shape described above.

Based on the integration determination range RF, it is determined whether a plurality of objects T belongs to the same object. In the description below, the condition for determining that a plurality of objects T belongs to the same object is referred to as an "integration condition". There are various examples of integration conditions. For example, the integration condition includes a condition that "in the integration determination range RF for one of a plurality of objects T, there is another object T". As another example, the integration condition may include a condition that "a plurality of integration determination ranges RF that are created, one for each of the plurality of objects T, overlaps with each other".

In the example shown in FIG. 2, a first object T1 and a second object T2 are shown as a plurality of objects T. The integration determination range RF1 is set for the first object T1, and the integration determination range RF2 is set for the second object T2. For example, looking at the integration determination range RF1 for the first object T1, the second object T2 is positioned in the integration determination range RF1. This indicates that, from the viewpoint of at least the detection positions, it is determined that the first object T1 and the second object T2 belong to the same object. In addition, from the viewpoint of the speed difference between the first object T1 and the second object T2, it may be determined whether the first object T1 and the second object T2 belong to the same object.

Figure 3:
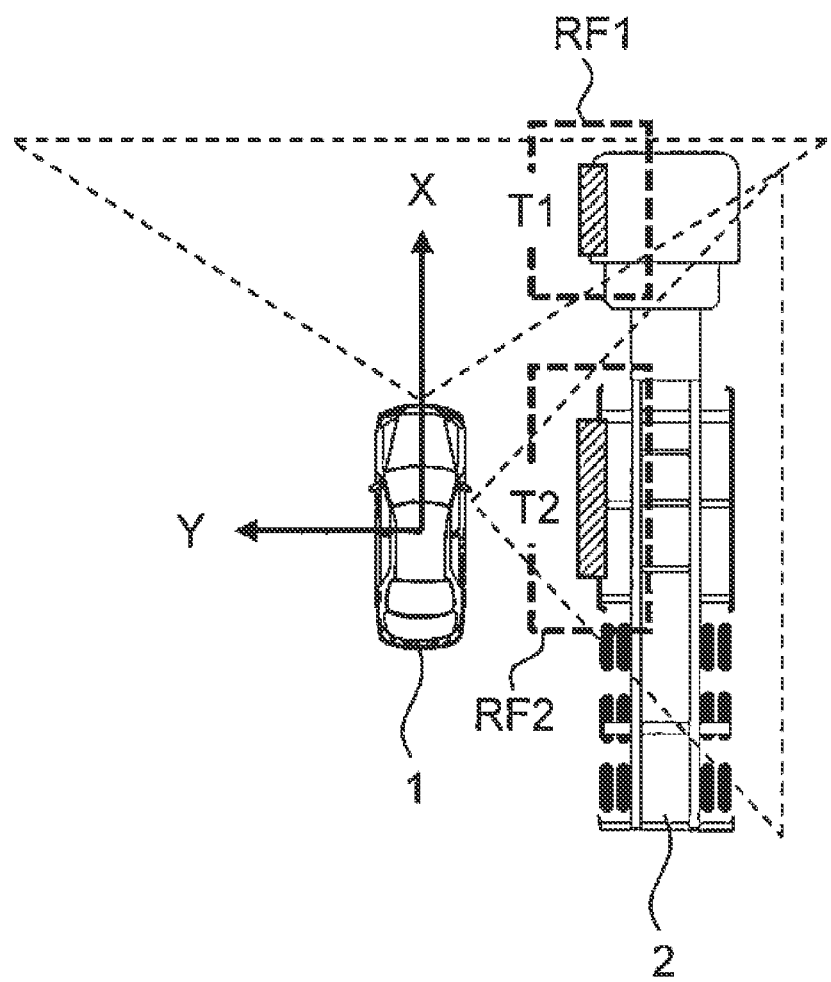
FIG. 3 is a conceptual diagram showing the integration determination processing for a long object.

FIG. 3 is a conceptual diagram showing the integration determination processing for a "long object". For example, there is a long truck 2 near the vehicle 1. In this figure, different portions of the truck 2 are detected by the two sensors as a first object T1 and a second object T2, respectively. In this case, too, the first object T1 and the second object T2 may be integrated as the same object (truck 2).

However, merely setting the integration determination range RF based on the detection position of an object T may create a possibility that the first object T1 and the second object T2 do not satisfy the integration condition as shown in FIG. 3. When the first object T1 and the second object T2 are not integrated as the same object as in this case, it appears as if there was a space between the first object T1 and the second object T2. This is undesirable from the viewpoint of vehicle travelling control.

One way to address this problem is to set the integration determination range RF based on the detection position of an object T and, then, to increase the integration determination range RF according to the predetermined rule. First, as comparative examples, consider increasing the integration determination range RF along "the X-axis direction (the longitudinal direction of the vehicle 1)".

FIG. 4 shows a first comparative example. In FIG. 4, different portions of the long truck 2 are detected as a first object T1 and a second object T2, respectively. As shown in the figure, the traveling direction of the truck 2 is not the X-axis direction. In this case, even when each of the integration determination ranges RF1 and RF2 is increased along the X-axis direction, the first object T1 and the second object T2 are not integrated as the same object. That is, the first object T1 and the second object T2, which should be recognized as the same object, are erroneously recognized as separate objects.

Figure 5:
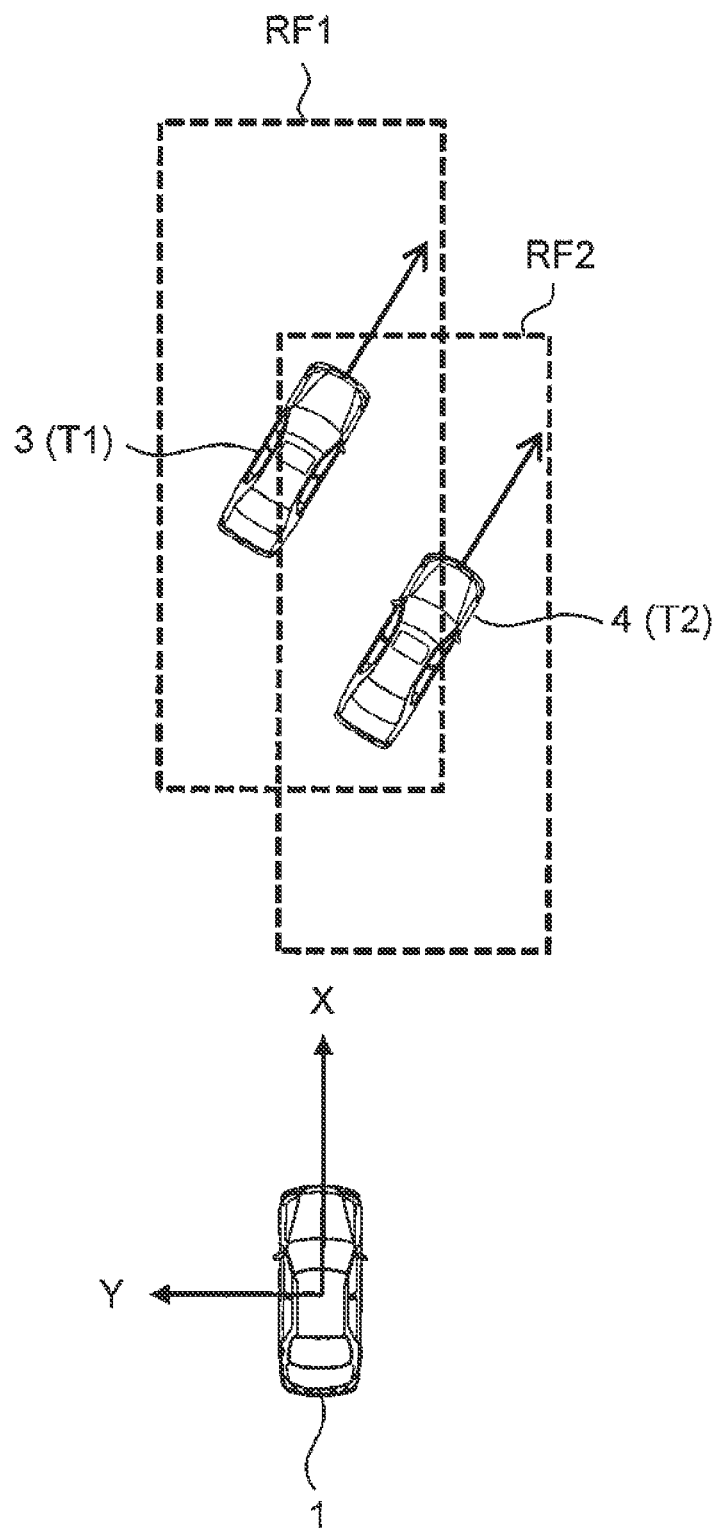
FIG. 5 is a conceptual diagram showing a second comparative example.

FIG. 5 shows a second comparative example. In FIG. 5, preceding vehicles 3 and 4 are detected as a first object T1 and a second object T2, respectively. The integration determination ranges RF1 and RF2 are increased along the X-axis direction and, as a result, the preceding vehicles 3 and 4 are integrated as the same object. That is, the preceding vehicles 3 and 4, which should be recognized as separate objects, are erroneously recognized as the same object.

As described above, the setting of the integration determination ranges RF in the comparative examples is not appropriate. This is because the X-axis direction (longitudinal direction of the vehicle 1) is unrelated to the objects T. The integration determination range RF increased along the X-axis direction unrelated to the object T is inappropriate for integrating a plurality of objects T. Inappropriate setting of the integration determination range RF leads to a decrease in the object recognition accuracy.

Figure 6:
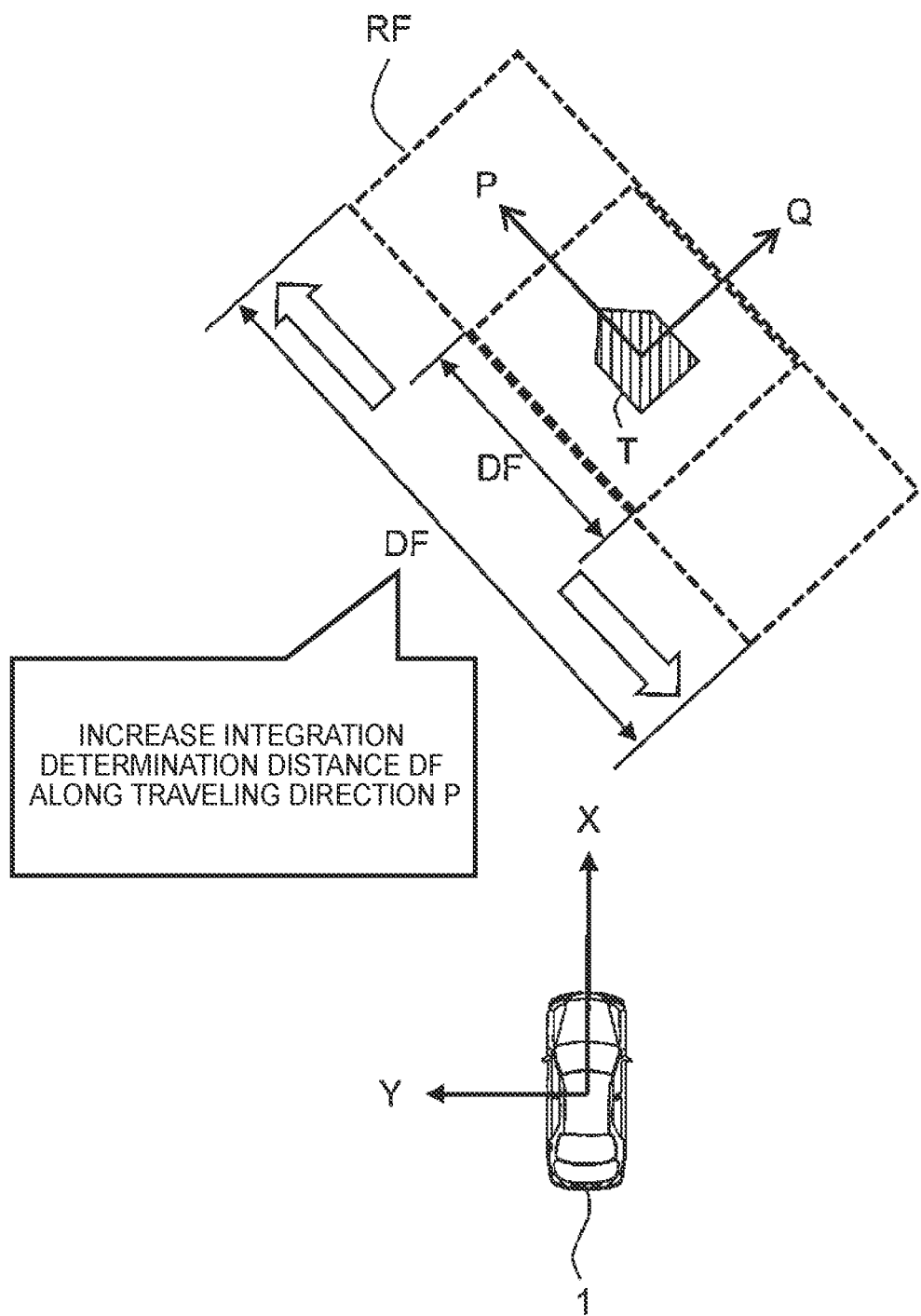
FIG. 6 is a conceptual diagram showing the setting method of an integration determination distance according to the embodiment of the present disclosure.

FIG. 6 is a conceptual diagram showing the features of this embodiment. The shape of the integration determination range RF is not necessarily a rectangle. In addition, there is a possibility that the integration determination range RF is set as a thin line. Therefore, in this embodiment, the "integration determination distance DF" that is a high-level concept of the integration determination range RF is assumed. The integration determination distance DF is a distance in which a detected object is determined to be the same as an object T.

According to this embodiment, the integration determination distance DF is initially set based on the detection position of an object T. The initially-set integration determination distance DF is the distance indicated by the thick dotted line in FIG. 6, in the embodiment. In addition, the traveling direction P of the object T is estimated. The integration determination distance DF is then increased, not along the X-axis direction unrelated to the object T, but along the traveling direction P of the object T. This is equivalent to increasing the integration determination range RF along the traveling direction P of the object T.

FIG. 7 is a conceptual diagram showing an example of the integration determination processing according to this embodiment. The example shown in FIG. 7 is the same as the first comparative example shown in FIG. 4 except for the setting of the integration determination range RF. According to this embodiment, the integration determination range RF1 is increased along the traveling direction P1 of the first object T1, and the integration determination range RF2 is increased along the traveling direction P2 of the second object T2. As a result, the first object T1 and the second object 12 are appropriately integrated as the same object (truck 2). Increasing the integration determination ranges RF in this way increases the object recognition accuracy.

Figure 8:
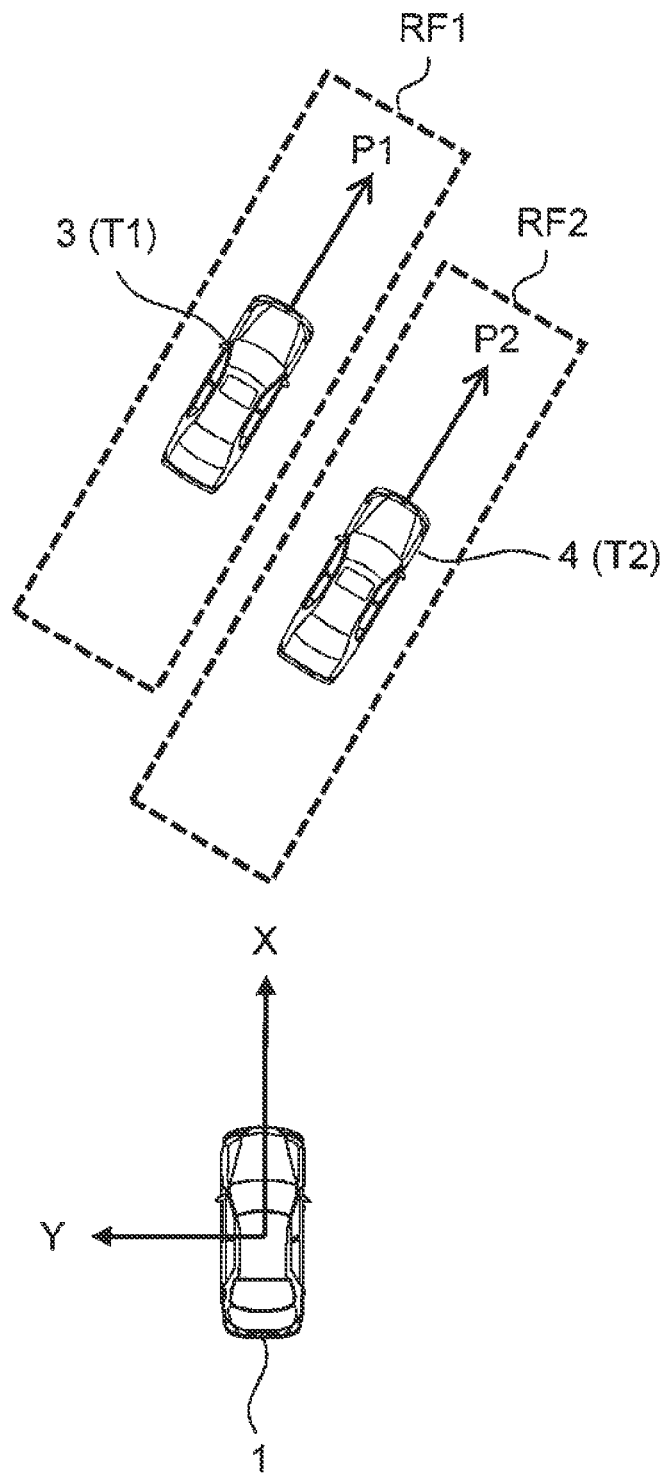
FIG. 8 is a conceptual diagram showing another example of the integration determination processing according to the embodiment of the present disclosure.

FIG. 8 is a conceptual diagram showing another example of the integration determination processing according to this embodiment. The example shown in FIG. 8 is the same as the second comparative example shown in FIG. 5 except for the setting of the integration determination range RF. According to this embodiment, the integration determination range RF1 is increased along the traveling direction P1 of the first object T1 (preceding vehicle 3), and the integration determination range RF2 is increased along the traveling direction P2 of the second object T2 (preceding vehicle 4). As a result, the preceding vehicles 3 and 4 are not integrated but are appropriately recognized as separate objects. That is, increasing the integration determination ranges RF in this way increases the object recognition accuracy.

In FIG. 6, the lateral direction Q is a direction orthogonal to the traveling direction P of the object T. The direction orthogonal to the traveling direction P of the object T may be a direction orthogonal to the traveling direction P of the object T on the same plane (a planar direction). In some embodiments, to avoid unnecessary object integration, the integration determination distance DF along the lateral direction Q may be maintained at the initially set value. In other words, extending the integration determination distance DF along the lateral direction Q may be prohibited. However, the integration determination distance DF along the lateral direction Q may be changed to the extent that an unnecessary object integration does not occur.

As described above, according to this embodiment, the integration determination processing is performed to determine whether a plurality of objects T belongs to the same object. The integration determination distance DF for use in the integration determination processing is initially set based on the detection position of an object T. In addition, the traveling direction P of the object T is estimated and, along the estimated traveling direction P, the integration determination distance DF is increased. That is, the integration determination distance DF is increased, not along the X-axis direction unrelated to the object T, but along the traveling direction P of the object T. Therefore, the accuracy of the integration determination processing based on the integration determination distance DF becomes higher than that of the above comparative examples. As a result, the object recognition accuracy is increased.

The object recognition technique according to this embodiment will be described below in more detail.

2. Configuration of Object Recognition Device

Figure 9:
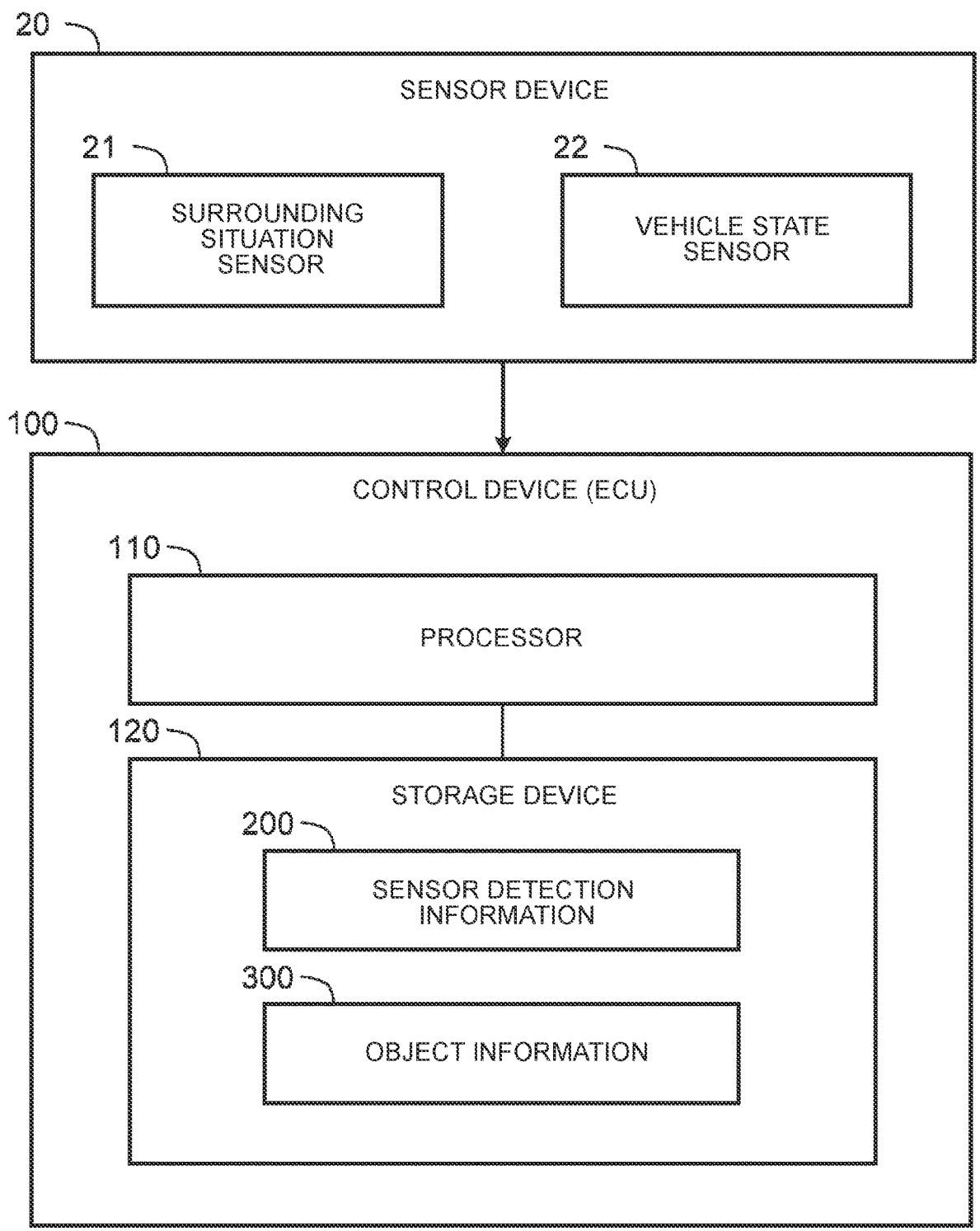
FIG. 9 is a block diagram showing a configuration example of an object recognition device according to the embodiment of the present disclosure.

FIG. 9 is a block diagram showing a configuration example of an object recognition device 10 according to this embodiment. The object recognition device 10, mounted on the vehicle 1, performs the "object recognition processing" for recognizing an object T around the vehicle 1. The object recognition device 10 includes a sensor device 20 and a control device 100.

The sensor device 20 includes a surrounding situation sensor 21 and a vehicle state sensor 22.

The surrounding situation sensor 21 is a sensor that detects the situation around the vehicle 1. More specifically, the surrounding situation sensor 21 includes a ranging sensor such as a LIDAR and a radar. The ranging sensor outputs a sending wave and receives a reflected wave from an object T around the vehicle 1. From the state of the reflected wave thus received, the ranging sensor can calculate the relative position (distance, direction) and the relative speed of the object T. The surrounding situation sensor 21 may further include a camera that captures the surroundings of the vehicle 1. There is no limit on the number of sensors and on the positions where they are mounted.

The vehicle state sensor 22 detects the state of the vehicle 1. For example, the vehicle state sensor 22 includes a wheel speed sensor, a vehicle speed sensor, a yaw rate sensor, and the like. The wheel speed sensor detects the rotation speed of each wheel of the vehicle 1. The vehicle speed sensor detects the speed of the vehicle 1. The yaw rate sensor detects the yaw rate of the vehicle 1.

The control device 100 is a microcomputer that controls the vehicle 1. The control device 100 is also called an Electronic Control Unit (ECU). The control device 100 includes a processor 110 and a storage device 120. The processor 110 performs various types of processing by executing the control program stored in the storage device 120. The storage device 120 stores various types of information.

For example, the processor 110 acquires sensor detection information 200 from the sensor device 20 and stores the acquired sensor detection information 200 in the storage device 120. The sensor detection information 200 indicates the result detected by the sensor device 20. More specifically, the sensor detection information 200 includes the surrounding situation information and the vehicle state information. The surrounding situation information indicates the surrounding situation detected by the surrounding situation sensor 21. For example, the surrounding situation information includes the point cloud information that indicates the position of a point cloud measured by the LIDAR. In addition, the surrounding situation information includes imaging information captured by the camera. The vehicle state information indicates the state of the vehicle 1 detected by the vehicle state sensor 22. The state of the vehicle 1 is, for example, the speed of the vehicle 1 (vehicle speed).

The processor 110 performs "object recognition processing" for recognizing an object T around the vehicle 1 based on the sensor detection information 200. The processor 110 generates object information 300 related to the recognized object T and stores the generated object information 300 in the storage device 120. The object information 300 indicates the position, speed (relative speed, absolute speed), size, traveling direction P of the object T. The object recognition processing according to this embodiment will be described below in more detail.

3. Object Recognition Processing

Figure 10:
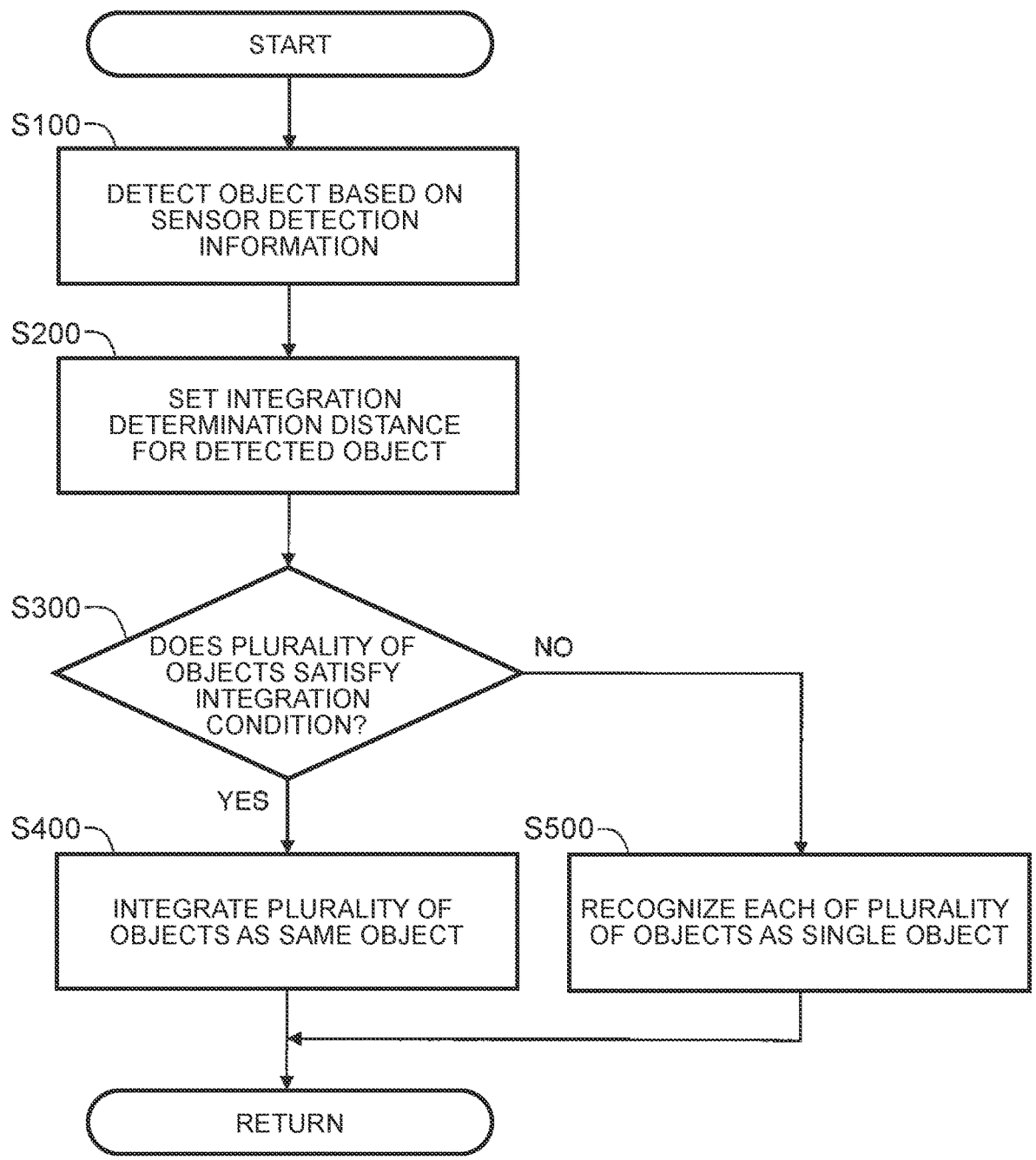
FIG. 10 is a flowchart showing the object recognition processing according to the embodiment of the present disclosure.

FIG. 10 is a flowchart showing the object recognition processing performed by the processor 110 (control device 100) according to this embodiment. The processing flow shown in FIG. 10 is performed repeatedly at regular cyclic intervals.

3-1. Step S100 Object Detection Processing

In step S100, the processor 110 performs object detection processing. More specifically, the processor 110 detects an object T around the vehicle 1 based on the sensor detection information 200 (surrounding situation information). For example, the processor 110 detects the object T based on the point cloud information that indicates the position of a point cloud measured by the LIDAR. In addition, the processor 110 detects the object T based on the imaging information captured by the camera. These object detection methods are known.

The processor 110 calculates the relative position and the relative speed of the object T with respect to the vehicle 1 based on the sensor detection information 200. The processor 110 may also calculate the absolute speed of the object T. The absolute speed of the object T is calculated from the speed of the vehicle 1 and the relative speed of the object T. The speed of the vehicle 1 is obtained from the vehicle state information. The processor 110 may also calculate the size of the object T. The processor 110 generates the object information 300 and stores the generated object information 300 in the storage device 120.

3-2. Step S200 Distance Setting Processing

In step S200, the processor 110 performs the distance setting processing to set the integration determination distance DF. As described above, the integration determination distance DF, a distance in which a detected object is determined to be to the same as the object T, is a concept including the integration determination range RF. The detail of the setting of the integration determination distance DF will be described later.

3-3. Step S300 Integration Determination Processing

In step S300, the processor 110 performs the integration determination processing described above. That is, the processor 110 determines whether a plurality of objects T belongs to the same object. The condition for determining that a plurality of objects T belongs to the same object is an integration condition. It can be said that the integration determination processing is the processing for determining whether a plurality of objects T satisfies the integration condition.

The integration condition includes a condition for the positions of objects T. For example, the integration condition includes a condition that "in the integration determination distance DF (integration determination range RF) for one of a plurality of objects T, there is another object T". The ratio of a part of an object T, which overlaps with the integration determination range RF, to the overall size may be taken into account. As another example, the integration condition may include a condition that "a plurality of integration determination ranges RF that are created, one for each of the plurality of objects T, overlaps with each other". Furthermore, the integration condition may include a condition for the speed of objects T. For example, the integration condition may include a condition that "the difference in relative speed between a plurality of objects T is within a predetermined range".

The processor 110 determines whether the plurality of objects T satisfies the integration condition based on the integration determination distance DF and the object information 300. When the plurality of objects T satisfies the integration condition (step S300; Yes), the processing proceeds to step S400. On the other hand, when the plurality of objects T does not satisfy the integration condition (step 3300; No), the processing proceeds to step S500.

3-4. Step S400 Object Integration Processing

In step S400, the processor 110 performs the object integration processing. That is, the processor 110 integrates and outputs the plurality of objects T, which satisfies the integration condition, as the same object. For example, the position and shape of the same object are calculated based on the rectangle that covers the plurality of integrated objects T. The speed of the same object is calculated as the weighted average of the speeds of the plurality of integrated objects T.

3-5. Step S500

In step S500, the processor 110 recognizes each of the plurality of objects T as a single object.

4. Method for Estimating the Traveling Direction of an Object

As described above, the traveling direction P of an object T is used in this embodiment when setting an integration determination distance DF. As a method for estimating the traveling direction P, there are many possible examples.

4-1. First Example

Figure 11:
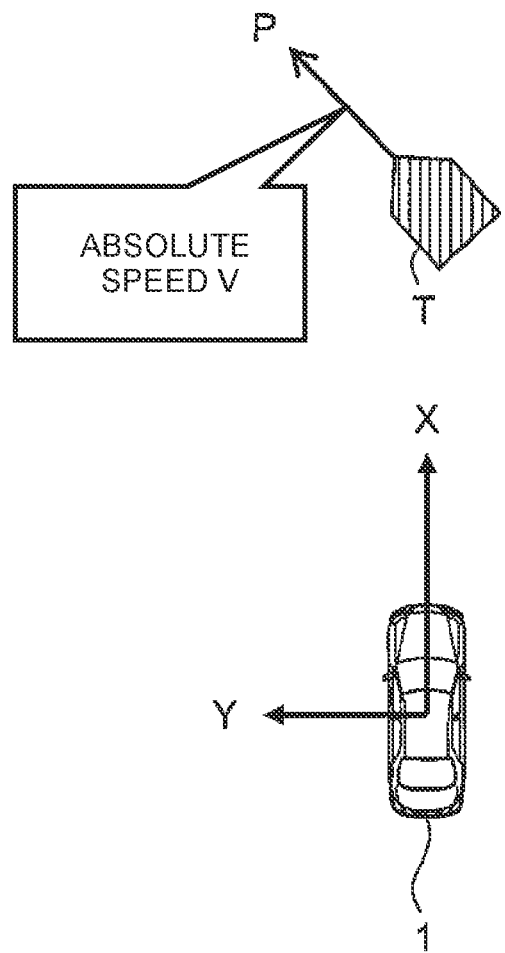
FIG. 11 is a conceptual diagram showing a first example of the method for estimating the traveling direction of an object in the embodiment of the present disclosure.

FIG. 11 is a conceptual diagram showing a first example of the method for estimating the traveling direction P of an object T. In the first example, the processor 110 calculates the absolute speed V of the object T based on the sensor detection information 200. The absolute speed V of the object T is calculated from the speed of the vehicle 1 and the relative speed of the object T. The speed of the vehicle 1 is obtained from the vehicle state information. After that, the processor 110 estimates the direction of the calculated absolute speed V as the traveling direction P.

4-2. Second Example

Figure 12:
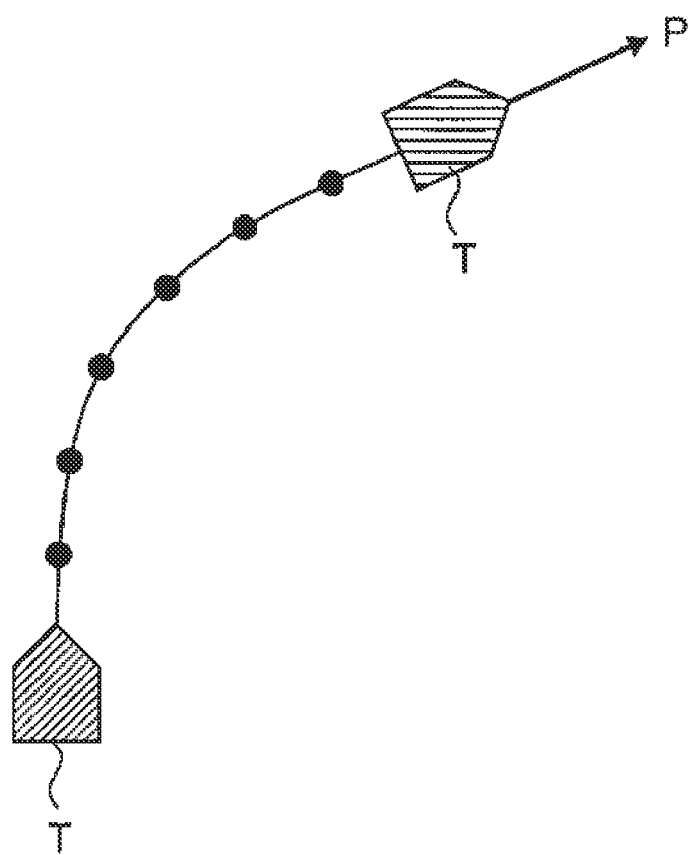
FIG. 12 is a conceptual diagram showing a second example of the method for estimating the traveling direction of an object in the embodiment of the present disclosure.

FIG. 12 is a conceptual diagram showing a second example of the method for estimating the traveling direction P of an object T. In the second example, the processor 110 estimates the traveling direction P of an object T based on the history of the absolute speed V. It is assumed that the position and the traveling direction P of the object T at the base time are known. For example, the traveling direction P at the base time is obtained by the method used in the first example. The processor 110 integrates the absolute speeds V (speed vector) after the base time to calculate the amount of change in the position and the traveling direction P of the object T. After that, the processor 110 estimates the traveling direction P of the object T at a desired time by adding the amount of change to the position and the traveling direction P of the object T at the base time.

4-3. The Third Example

Figure 13:
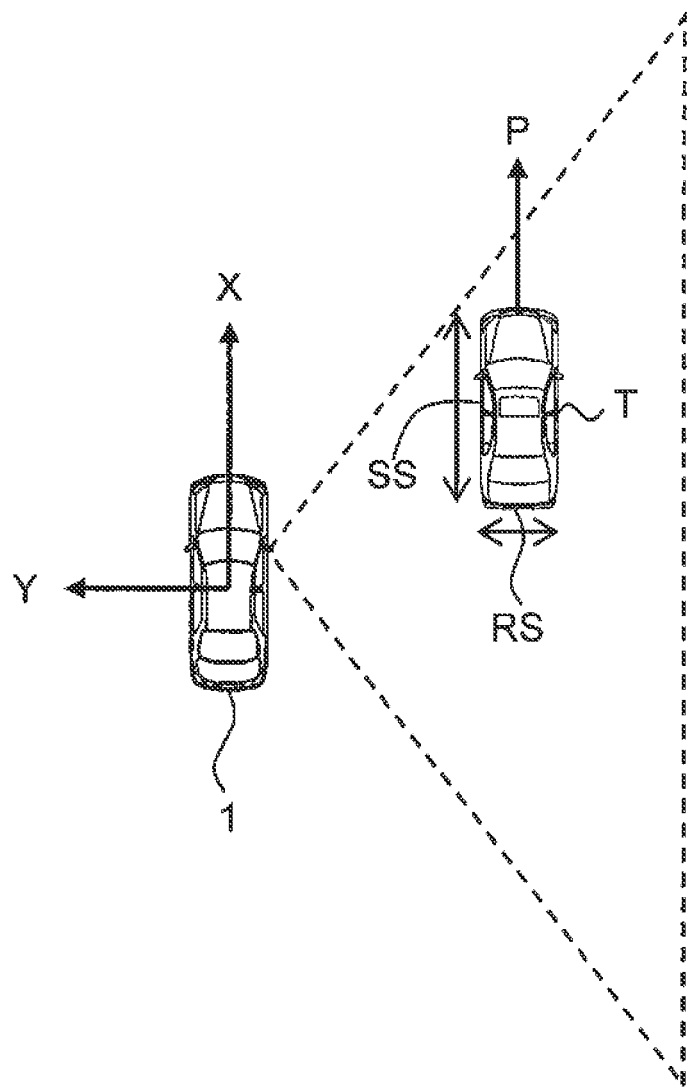
FIG. 13 is a conceptual diagram showing a third example of the method for estimating the traveling direction of an object in the embodiment of the present disclosure.

FIG. 13 is a conceptual diagram showing a third example of the method for estimating the traveling direction P of an object T. In the third example, the processor 110 estimates the longitudinal direction of the shape of an object T based on the sensor detection information 200. After that, the processor 110 estimates the longitudinal direction to be the traveling direction P of the object T. This method is also applicable to a stationary object T.

In the example shown in FIG. 13, the object T is another vehicle. The two sides SS and RS, corresponding respectively to the side and the rear of the other vehicle, are detected as the sides constituting the object T. The length of the side SS is larger than the length of the side RS. In this case, the processor 110 estimates the direction of the side SS as the longitudinal direction of the object T, that is, as the traveling direction P. Considering the width of a typical vehicle, only a side having a length equal to or larger than a predetermined lower limit value may be extracted.

Figure 14:
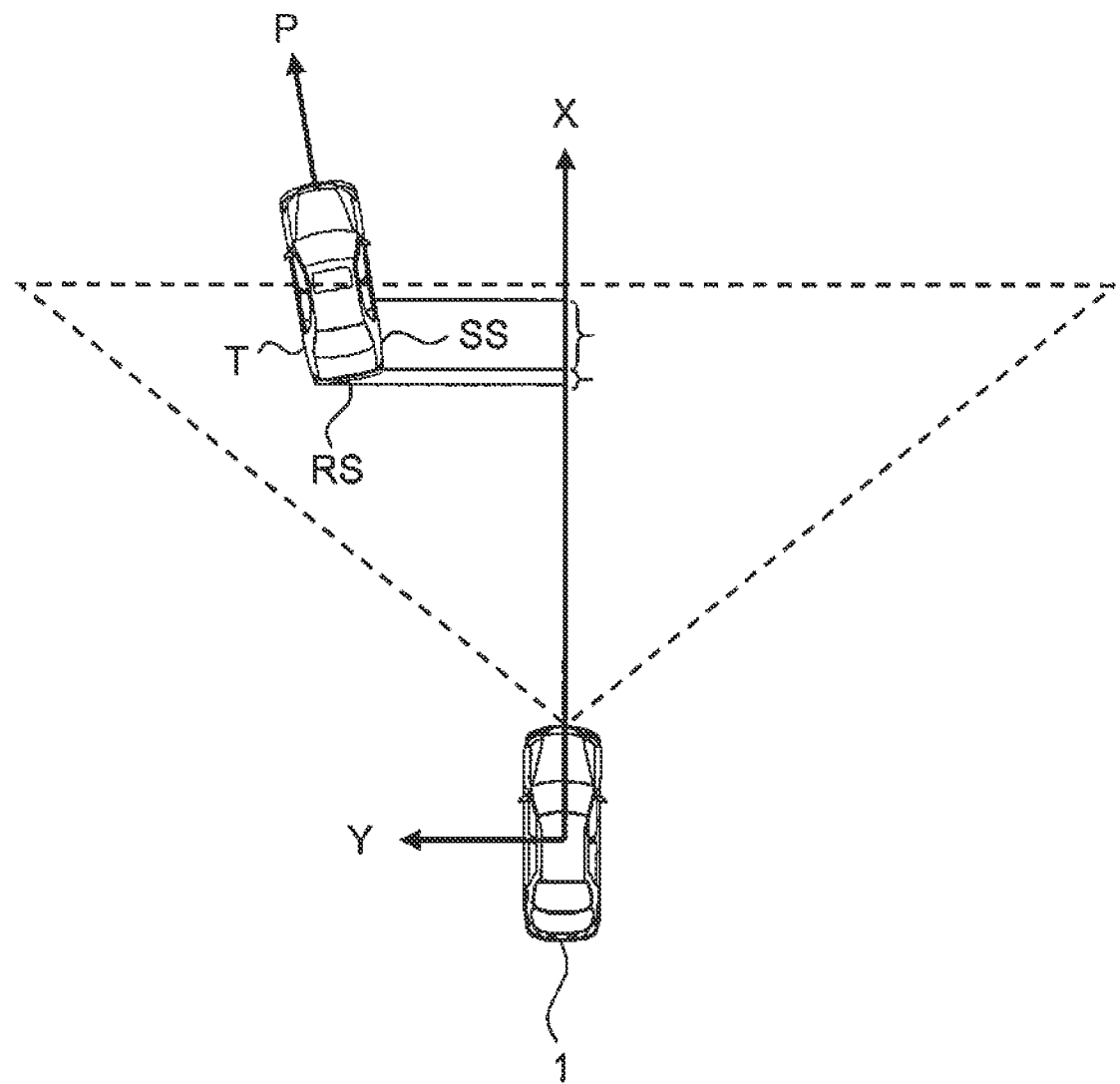
FIG. 14 is a conceptual diagram showing another third example of the method for estimating the traveling direction of an object in the embodiment of the present disclosure.

In the example shown in FIG. 14, the processor 110 projects the detected sides SS and RS onto the X axis. The projection length of the side SS is larger than the projection length of the side RS. In this case, the processor 110 estimates the direction of the side SS as the longitudinal direction of the object T, that is, as the traveling direction P. According to this method, since the projection length of the side RS corresponding to the rear of the vehicle is smaller, it becomes easier to extract the side SS.

The processor 110 may analyze the imaging information, captured by the camera, to recognize the side and the rear of another vehicle. In this case, the processor 110 estimates the direction parallel to the side as the longitudinal direction, that is, as the traveling direction P.

5. Method for Setting the Integration Determination Distance

Next, step S200 (distance setting processing) of the object recognition processing according to this embodiment will be described in detail. There are many possible examples of processing in step S200.

5-1. First Example

Figure 15:
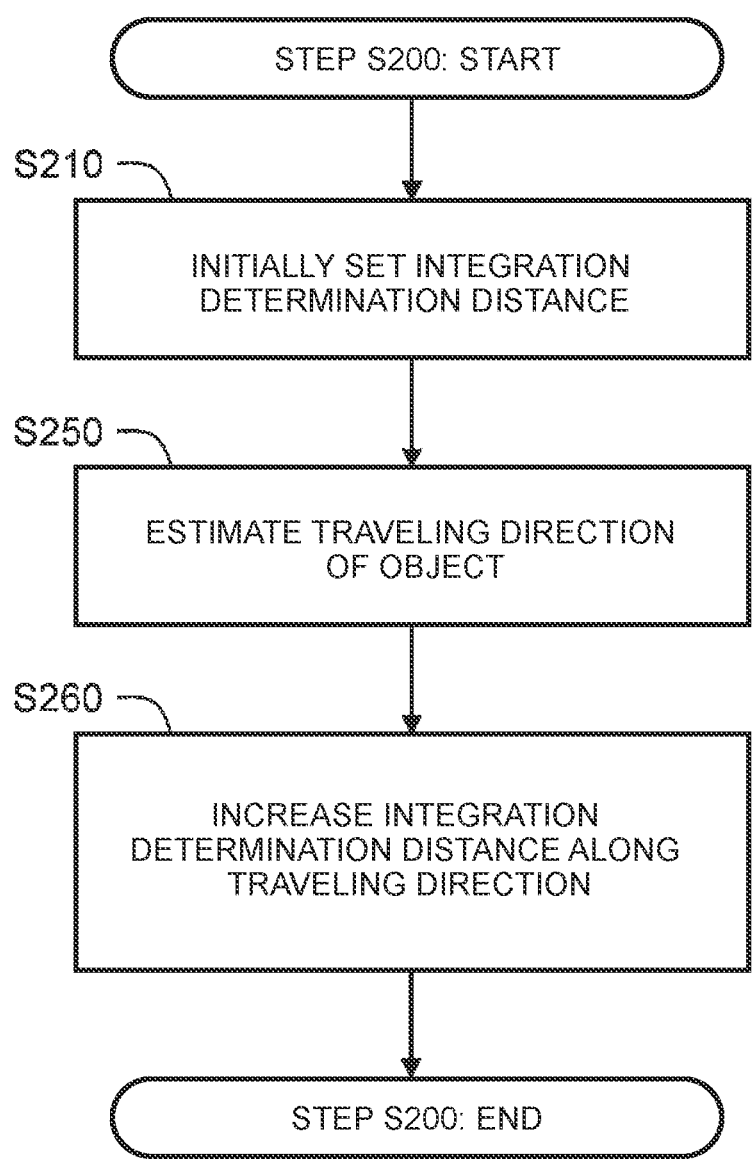
FIG. 15 is a flowchart showing a first example of step S200 (distance setting processing) of the object recognition processing according to the embodiment of the present disclosure.

FIG. 15 is a flowchart showing a first example of processing in step S200.

In step S210, the processor 110 initially sets the integration determination distance DF (integration determination range RF) for the detected object T. More specifically, the processor 110 refers to the object information 300 and, based on the detection position of the object T obtained by referring to the object information 300, initially sets the integration determination distance DF. The detection position used as the base is the base point. For example, the point nearest to the vehicle 1 is used as the base point. As another example, a point that is stably detected (tracked) over a certain period of time may be used as the base point. The initially set value of the integration determination distance DF may be set as a constant value or may be set according to the detection range of the object T.

In step S250, the processor 110 estimates the traveling direction P of the object T based on the sensor detection information 200. The method for estimating traveling direction P is as described in section 4 "Method for estimating the traveling direction of an object" given above.

In step S260, the processor 110 increases the integration determination distance DF for the object T along the traveling direction P of the object T. An upper limit value of the integration determination distance DF may be set. An upper limit value, when set, prevents the integration determination distance DF from becoming extremely large as the integration determination distance DF becomes larger.

5-2. Second Example

Figure 16:
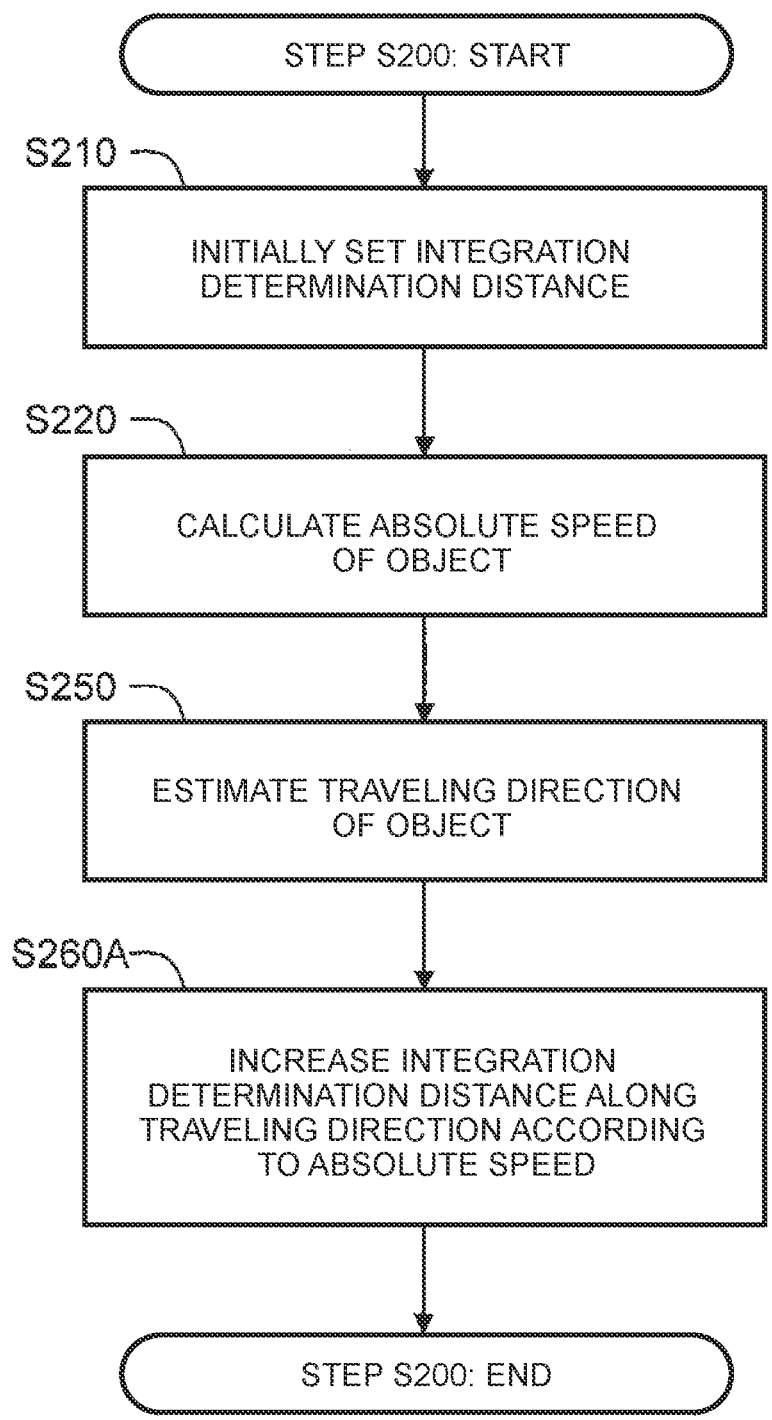
FIG. 16 is a flowchart showing a second example of step S200 (distance setting processing) of the object recognition processing according to the embodiment of the present disclosure.

FIG. 16 is a flowchart showing a second example of processing in step S200. A duplicate description of those steps included in the first example will be omitted as appropriate. Step S210 and step S250 are the same as those in the first example.

In step S220, the processor 110 calculates the absolute speed V of the object T based on the sensor detection information 200. The absolute speed V of the object T is calculated from the speed of the vehicle 1 and the relative speed of the object T. The speed of the vehicle 1 is obtained from the vehicle state information.

In the second example, step S260A is performed instead of step S260. In step S260A, the processor 110 increases the integration determination distance DF along the traveling direction P of the object T. At this time, the processor 110 increases the increase amount of the integration determination distance DF along the traveling direction P according to the absolute speed V of the object T. That is, as the absolute speed V of the object T becomes higher, the increase amount of the integration determination distance DF along the traveling direction P becomes larger.

Figure 17:
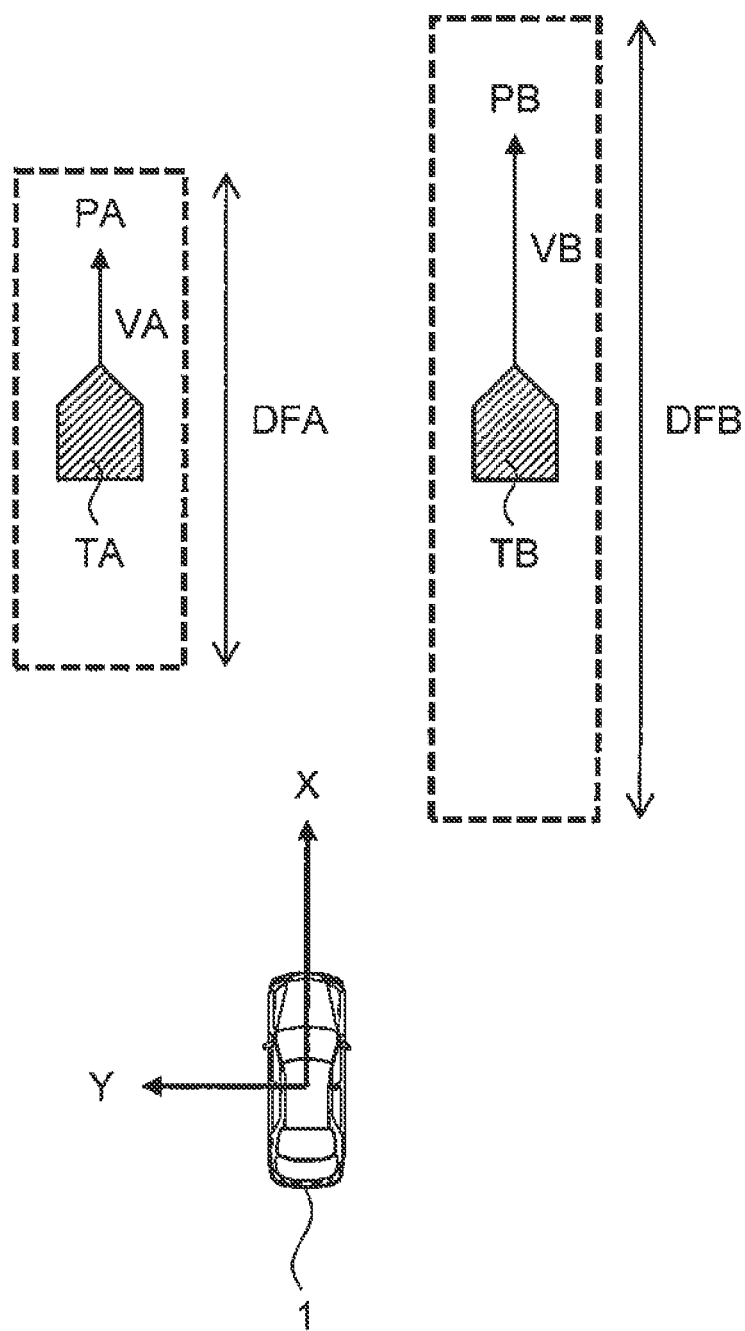
FIG. 17 is a conceptual diagram showing a second example of step S200 (distance setting processing) of the object recognition processing according to the embodiment of the present disclosure.

FIG. 17 shows an example of step S260A. The integration determination distance DFA for the object TA is increased along the traveling direction PA of the object TA. The integration determination distance DFB for the object TB is increased along the traveling direction PB of the object TB. As shown in the figure, assume that the absolute speed VB of the object TB is higher than the absolute speed VA of the object TA. As a result, the integration determination distance DFB for the object TB becomes larger than the integration determination distance DFA for the object TA.

An upper limit value of the integration determination distance DF may be set. An upper limit value, when set, prevents the integration determination distance DF from becoming extremely large as the integration determination distance DF becomes larger. A lower limit value of the integration determination distance DF may be set. A lower limit value, when set, allows a certain amount of the integration determination distance DF to be reserved even for a stationary object T.

5-3. Third Example

Figure 18:
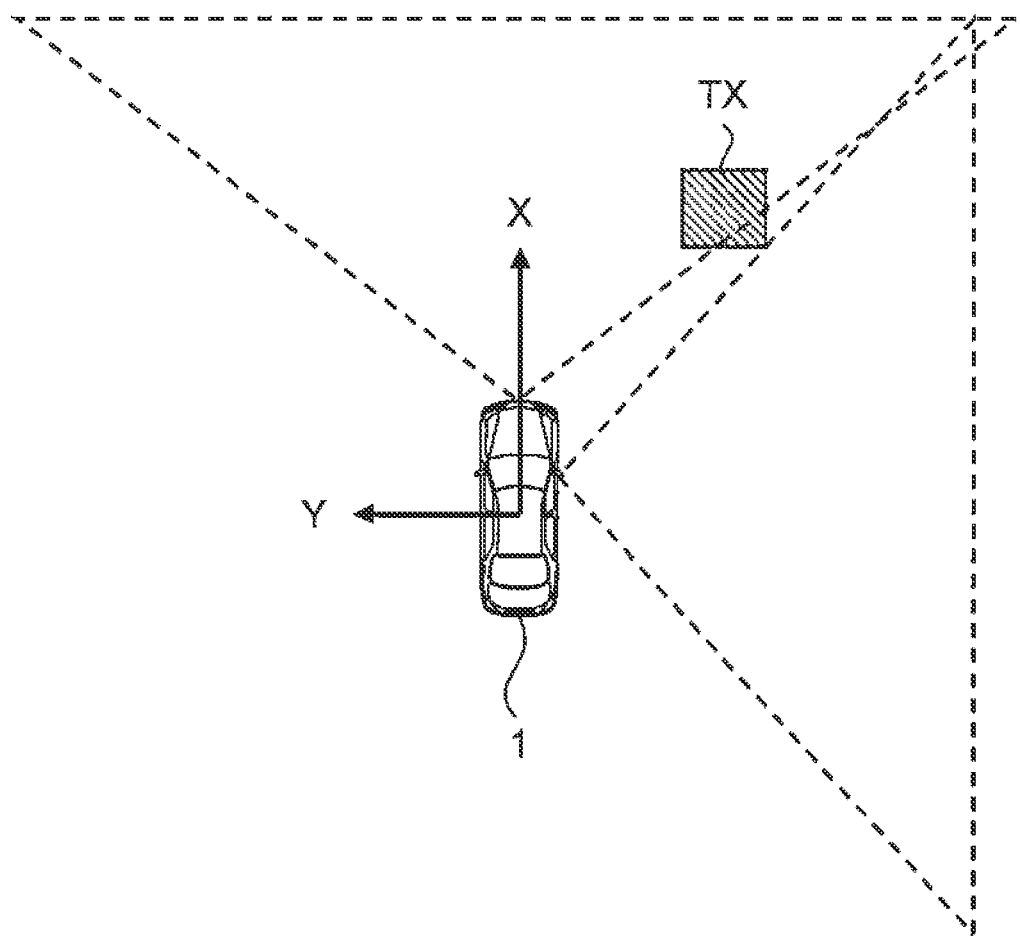
FIG. 18 is a conceptual diagram showing a third example of step S200 (distance setting processing) of the object recognition processing according to the embodiment of the present disclosure.

In the second example described above, the increase amount of the integration determination distance DF along the traveling direction P increases according to the absolute speed V of the object T. However, in some cases, the reliability of the calculated absolute speed V is low. For example, in FIG. 18, the object TX is located near the boundary of the field of view of the sensor. The reliability of the absolute speed V calculated (estimated) for such an object TX is low. When the integration determination distance DF is set based on the absolute speed V with low reliability, the accuracy of the integration determination distance DF is not increased but decreased. To address this problem, the setting method of the integration determination distance DF is changed in the third example according to the reliability of the absolute speed V.

Figure 19:
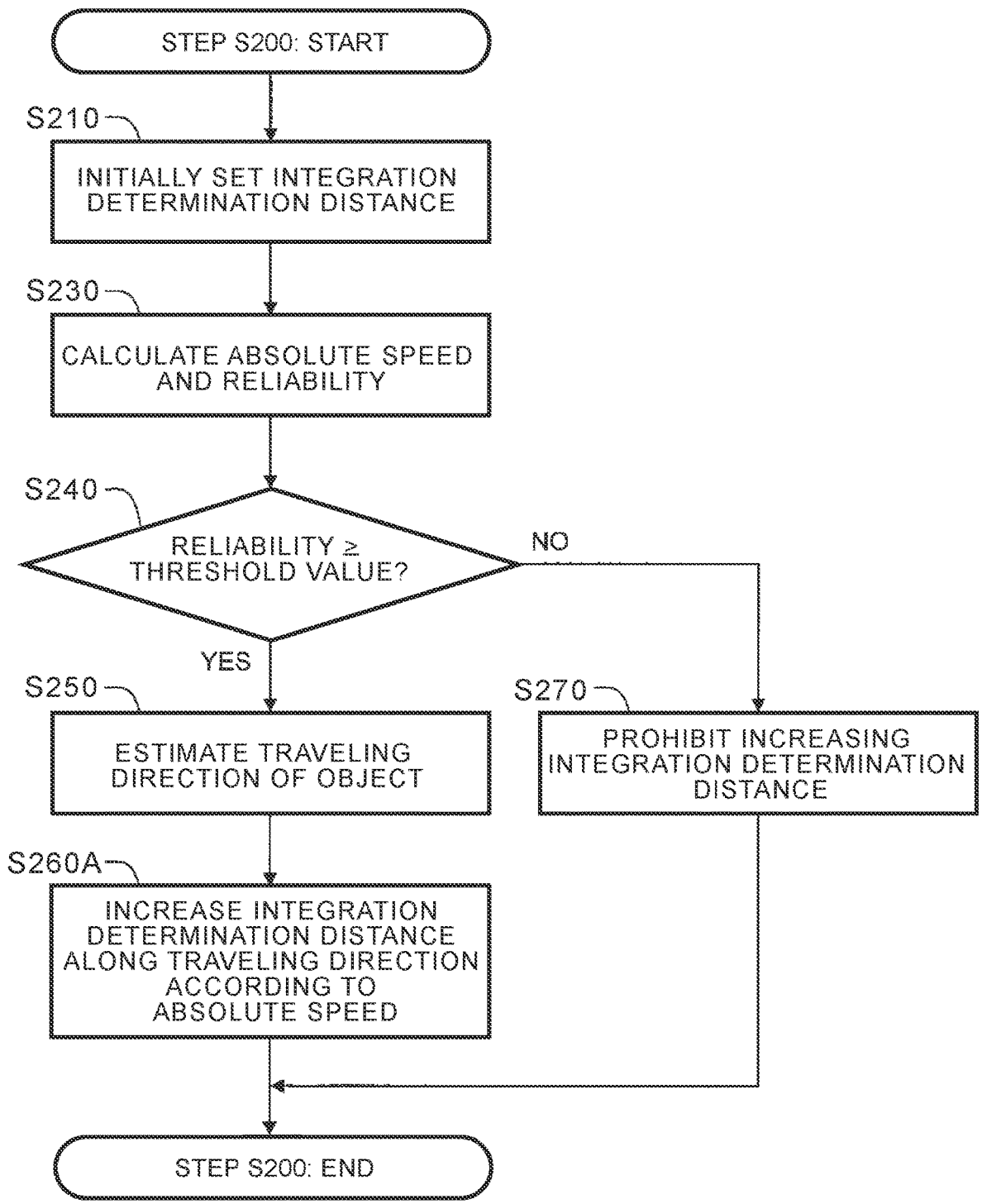
FIG. 19 is a flowchart showing a third example of step S200 (distance setting processing) of the object recognition processing according to the embodiment of the present disclosure.

FIG. 19 is a flowchart showing a third example of processing in step S200. A duplicate description of those steps included in the second example will be omitted as appropriate.

In step S230, the processor 110 calculates the absolute speed V of the object T and the reliability of the absolute speed V based on the sensor detection information 200. For example, as the object T gets nearer to the boundary of the field of view of the sensor, the reliability of the absolute speed V becomes lower. As another example, as the number of detections of the object T becomes smaller, the reliability of the absolute speed V becomes lower. As still another example, as the variation of the absolute speed V in a certain period becomes larger, the reliability of the absolute speed V becomes lower.

In step S240 that follows, the processor 110 compares the reliability of the absolute speed V with a predetermined threshold.

When the reliability is equal to or higher than the threshold value (step S240: Yes), the processor 110 determines that the object T is a "high reliability object". In this case, the processing proceeds to steps S250 and S260A. Steps S250 and S260A are the same as those in the second example. That is, for a high reliability object, the processor 110 increases the increase amount of the integration determination distance DF along the traveling direction P according to the absolute speed V.

On the other hand, when the reliability is lower than the threshold value (step S240; No), the processor 110 determines that the object T is a "low reliability object". In this case, the processing proceeds to step S270. In step S270, the processor 110 prohibits increasing the integration determination distance DF for the low reliability object along the traveling direction P. In other words, the processor 110 does not increase the integration determination distance DF along the traveling direction P but maintains the initially set integration determination distance DF.

In this way, according to the third example, the integration determination distance DF is set considering the reliability of the absolute speed V. For a low reliability object, an increase in the integration determination distance DF is prohibited. Prohibiting an increase in the integration determination distance DF in this way ensures a certain level of accuracy of the integration determination distance DF, thus preventing the object recognition accuracy from being decreased.

5-4. Fourth Example

Figure 20:
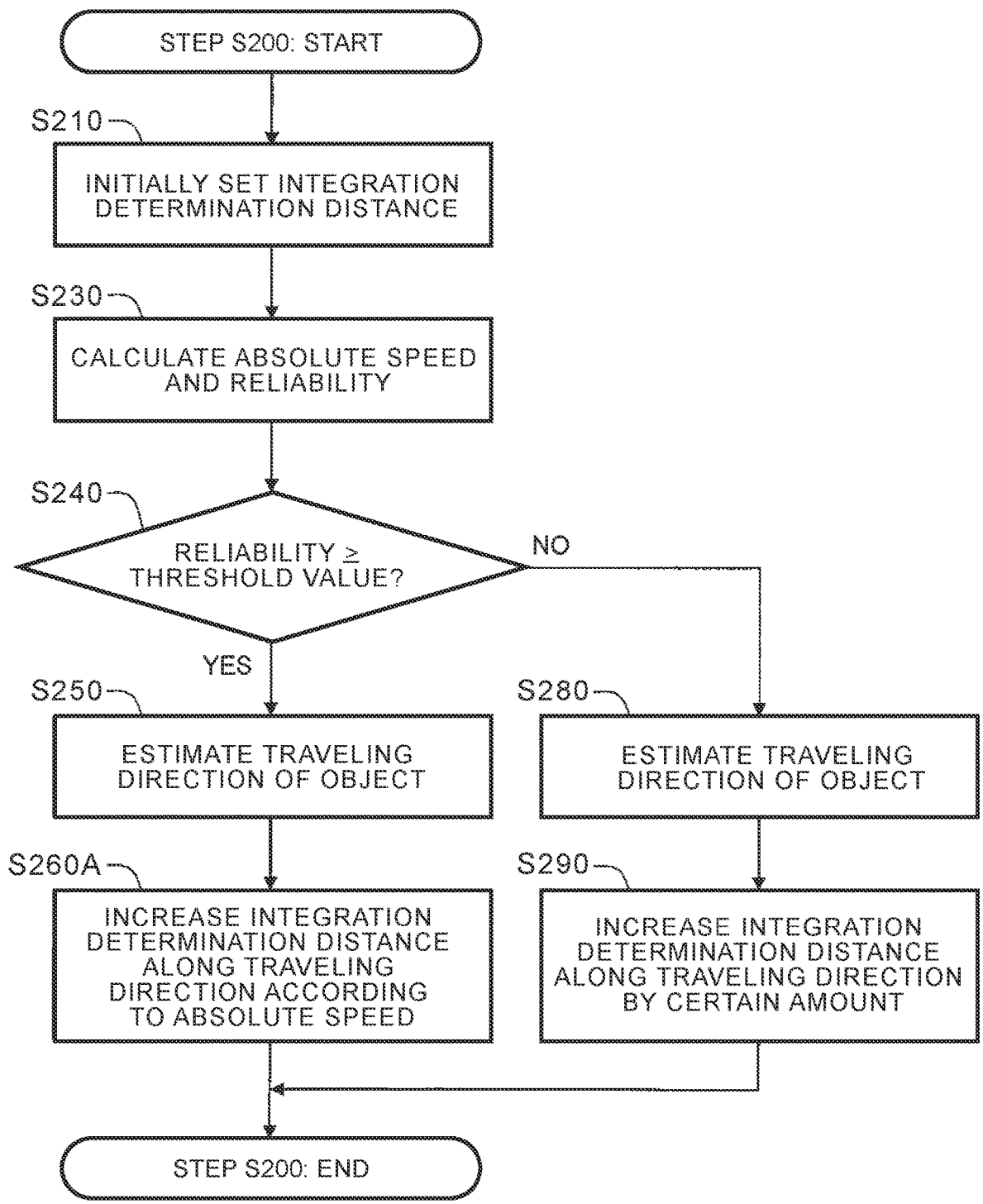
FIG. 20 is a flowchart showing a fourth example of step S200 (distance setting processing) of the object recognition processing according to the embodiment of the present disclosure.

FIG. 20 is a flowchart showing a fourth example of processing in step S200. The fourth example is a modification of the third example. A duplicate description of those steps included in the third example will be omitted as appropriate.

When the reliability of the absolute speed V is lower than the threshold value (step S240; No), the processing proceeds to step S280. In step S280, the processor 110 estimates the traveling direction P of the object T (low reliability object) based on the sensor detection information 200. At this time, the traveling direction P may be estimated by a method not using the absolute speed V.

In step S290 that follows, the processor 110 increases the integration determination distance DF along the traveling direction P. However, for the low reliability object, the processor 110 increases the integration determination distance DF without using the absolute speed V. More specifically, the processor 110 sets the increase amount of the integration determination distance DF along the traveling direction P to a constant amount. Increasing the integration determination distance DF without using the low-reliability absolute speed V in this way prevents the accuracy of the integration determination distance DF from being decreased.

5-5. Fifth Example

The lateral direction Q of an object T is the planar direction orthogonal to the traveling direction P of the object T (see FIG. 6). In the fifth example, the integration determination distance DF along the lateral direction Q will be described.

When the integration determination distance DF is increased along the lateral direction Q, there is a high possibility that a plurality of objects T not belonging to the same object are mistakenly integrated. Therefore, the processor 110 prohibits the integration determination distance DF from being increased along the lateral direction Q. In other words, the processor 110 does not increase the integration determination distance DF along the lateral direction Q but maintains the initially set value.

The fifth example is applicable to any of the first to fourth examples described above. Application of the fifth example prevents unnecessary object integration and further improves the object recognition accuracy.

6. Driving Assistance Control

The object recognition device 10 according to this embodiment may be applied to "driving assistance control" that assists the driver in driving the vehicle 1. Examples of such driving assistance control include autonomous driving control, follow-up traveling control, and collision avoidance control.

Figure 21:
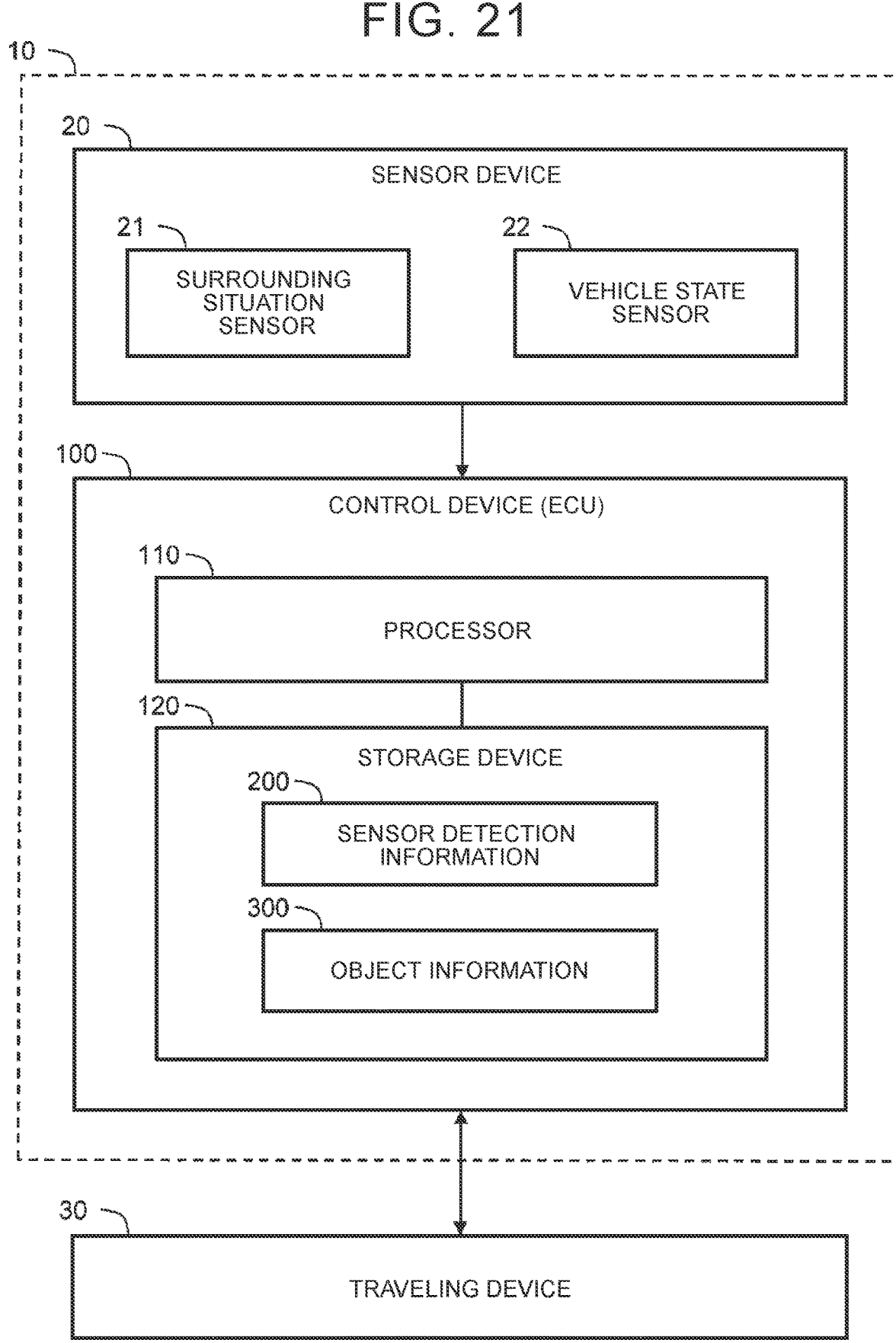
FIG. 21 is a block diagram showing a configuration example of a driving assistance system according to the embodiment of the present disclosure.

FIG. 21 is a block diagram showing a configuration example of a driving assistance system according to this embodiment. The driving assistance system, installed in the vehicle 1, performs driving assistance control to assist the driver in driving the vehicle 1. This driving assistance system includes a sensor device 20, a traveling device 30, and a control device 100.

The traveling device 30 includes a driving device, a braking device, and a steering device. The driving device is a power source for generating a driving force. Examples of the driving device include an engine, an electric motor, and an in-wheel motor. The braking device generates a braking force. The steering device steers the wheels of the vehicle 1. For example, the steering device includes an Electric Power Steering (EPS) device.

The control device 100 (processor 110) controls the operation of the traveling device 30 to perform vehicle traveling control. The vehicle traveling control includes driving control, braking control, and steering control. The driving control is performed through the driving device. The braking control is performed through the braking device. The steering control is performed through the steering device.

The control device 100 (processor 110) performs the object recognition processing described above. Furthermore, the control device 100 performs driving assistance control (autonomous driving control, follow-up traveling control, collision avoidance control) by performing vehicle traveling control as necessary based on the object recognition result.

In the embodiment, the processor may be configured to prohibit the integration determination distance from being increased along a lateral direction that is a direction orthogonal to the traveling direction of the first object.

In the embodiment, the sensor may further be configured to detect a state of the vehicle, the sensor detection information may further indicate a speed of the vehicle, and the processor may be configured to calculate an absolute speed of the first object based on the sensor detection information, and increase an increase amount of the integration determination distance according to the absolute speed when the integration determination distance is increased along the traveling direction.

In the embodiment, the sensor may further be configured to detect a state of the vehicle, the sensor detection information may further indicate a speed of the vehicle, and the processor may be configured to calculate an absolute speed of the first object and a reliability of the absolute speed based on the sensor detection information, and when the reliability is equal to or higher than a threshold value, increase an increase amount of the integration determination distance according to the absolute speed when the integration determination distance is increased along the traveling direction.

In the embodiment, when the reliability is lower than the threshold value, the processor may be configured to prohibit increasing the integration determination distance along the traveling direction.

In the embodiment, when the reliability is lower than the threshold value, the processor may be configured to set the increase amount of the integration determination distance to a constant amount when the integration determination distance is increased along the traveling direction.

In the embodiment, the sensor may further be configured to detect a state of the vehicle, the sensor detection information may further indicate a speed of the vehicle, and the processor may be configured to calculate an absolute speed of the first object based on the sensor detection information, and estimate the traveling direction based on the absolute speed.

In the embodiment, the processor may be configured to estimate a longitudinal direction of a shape of the first object based on the sensor detection information, and estimate the longitudinal direction as the traveling direction.

In the embodiment, the processor may be configured to perform driving assistance control related to traveling of the vehicle based on a determination result of determining whether the first object and the second object belong to the same object.

What is claimed is:

1. An object recognition device mounted on a vehicle, the object recognition device comprising:
   a sensor configured to detect a situation around the vehicle;
   a storage device in which sensor detection information is stored, the sensor detection information indicating a detection result detected by the sensor; and
   a processor configured to
   detect, based on the sensor detection information, a first object and a second object, the first object and the second object being present around the vehicle,
   initially set, based on a detection position of the first object, an integration determination distance, the integration determination distance being a range within which the first object and the second object are determined to belong to the same object,
   estimate a traveling direction of the first object based on the sensor detection information,
   increase the integration determination distance along the traveling direction,
   after increasing the integration determination distance along the traveling direction, determine, based on the integration determination distance, whether the first object and the second object belong to the same object, and
   output the first object and the second object as the same object when it is determined that the first object and the second object belong to the same object.

2. The object recognition device according to claim 1, wherein
   the processor is configured to prohibit the integration determination distance from being increased along a lateral direction that is a direction orthogonal to the traveling direction of the first object.

3. The object recognition device according to claim 1, wherein
   the sensor is further configured to detect a state of the vehicle, the sensor detection information further indicates a speed of the vehicle, and the processor is configured to calculate an absolute speed of the first object based on the sensor detection information, and increase an increase amount of the integration determination distance according to the absolute speed when the integration determination distance is increased along the traveling direction.

4. The object recognition device according to claim 1, wherein the sensor is further configured to detect a state of the vehicle, the sensor detection information further indicates a speed of the vehicle, and the processor is configured to calculate an absolute speed of the first object and a reliability of the absolute speed based on the sensor detection information, and when the reliability is equal to or higher than a threshold value, increase an increase amount of the integration determination distance according to the absolute speed when the integration determination distance is increased along the traveling direction.

5. The object recognition device according to claim 4, wherein when the reliability is lower than the threshold value, the processor is configured to prohibit increasing the integration determination distance along the traveling direction.

6. The object recognition device according to claim 4, wherein when the reliability is lower than the threshold value, the processor is configured to set the increase amount of the integration determination distance to a constant amount when the integration determination distance is increased along the traveling direction.

7. The object recognition device according to claim 1, wherein the sensor is further configured to detect a state of the vehicle, the sensor detection information further indicates a speed of the vehicle, and the processor is configured to calculate an absolute speed of the first object based on the sensor detection information, and estimate the traveling direction based on the absolute speed.

8. The object recognition device according to claim 1, wherein the processor is configured to estimate a longitudinal direction of a shape of the first object based on the sensor detection information, and estimate the longitudinal direction as the traveling direction.

9. The object recognition device according to claim 1, wherein the processor is configured to perform driving assistance control related to traveling of the vehicle based on a determination result of determining whether the first object and the second object belong to the same object.

* * * * *

UNITED STATES PATENT AND TRADEMARK OFFICE
CERTIFICATE OF CORRECTION

| | |
|---|---|
| PATENT NO. | : 11,247,671 B2 |
| APPLICATION NO. | : 16/433183 |
| DATED | : February 15, 2022 |
| INVENTOR(S) | : Komori |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 323 days.

Signed and Sealed this
Seventh Day of February, 2023

Katherine Kelly Vidal
*Director of the United States Patent and Trademark Office*